United States Patent [19]

Martensson et al.

[11] Patent Number: 5,201,950
[45] Date of Patent: Apr. 13, 1993

[54] LOW BRIGHTNESS MAGNESIUM SILICATE SLR FILLER LOW BRIGHTNESS PAPER CONTAINING THE FILLER AND METHODS TO PRODUCE THE FILLER AND USE IT IN LOW BRIGHTNESS PAPERS

[75] Inventors: Leif B. Martensson; Kaarina Heikkila, both of Hamina, Finland

[73] Assignee: J. M. Huber Corporation, Rumson, N.J.

[21] Appl. No.: 674,293

[22] Filed: Mar. 22, 1991

Related U.S. Application Data

[63] Continuation of Ser. No. 262,930, Oct. 26, 1988, abandoned, which is a continuation-in-part of Ser. No. 243,398, Sep. 12, 1988, abandoned, which is a continuation-in-part of Ser. No. 34,991, Apr. 6, 1987, Pat. No. 4,780,297.

[51] Int. Cl.$^5$ ............... C09C 1/24; C09C 1/02; C09C 1/28
[52] U.S. Cl. .................. 106/457; 106/466; 106/481; 106/483; 106/492; 423/311; 423/326
[58] Field of Search ............... 106/457, 466, 481, 483, 106/492; 423/311

[56] References Cited

U.S. PATENT DOCUMENTS

| | | | |
|---|---|---|---|
| 1,865,224 | 6/1932 | Winston et al. | 423/554 |
| 2,402,370 | 6/1946 | Chalmers | 423/167 |
| 3,320,029 | 5/1967 | Adams | 423/159 |
| 3,325,276 | 6/1967 | Feller | 71/64.12 |
| 3,328,124 | 6/1967 | Mays et al. | 423/325 |
| 3,328,125 | 6/1967 | Mays et al. | 423/328 |
| 3,338,667 | 8/1967 | Pundsack | 423/144 |
| 3,401,015 | 9/1968 | Ninger et al. | 423/331 |
| 3,437,441 | 4/1969 | Mays et al. | 423/118 |
| 4,058,587 | 11/1977 | Nelson | 423/220 |
| 4,277,449 | 7/1981 | Lalancette | 423/167 |
| 4,810,280 | 3/1989 | le van Mao et al. | 71/62 |

FOREIGN PATENT DOCUMENTS

| | | |
|---|---|---|
| 624441 | 5/1963 | Belgium . |
| 748364 | 12/1966 | Canada . |
| 55-71761 | 5/1980 | Japan ................ 106/466 |

OTHER PUBLICATIONS

"Industrial Minerals and Rocks" 2nd. Ed., The American Institute of Mining and Metallurgical Engineers, pp. 538–539, 1949.

S. A. Wason, "Cosmetic properties and structure of fine particle synthetic precipitated silicas", *J. Soc. Cosmet. Cem.* 29, 497–521 (Aug. 1978).

*Primary Examiner*—Mark L. Bell
*Assistant Examiner*—Scott L. Hertzog
*Attorney, Agent, or Firm*—Harold H. Flanders; Alec H. Horn; Robert L. Price

[57] ABSTRACT

A method for producing a low-structure magnesium silicate SLR product useful to lower the strike through of low brightness paper products comprises adding a raw mineral source of soluble magnesium ions and sulfuric acid in a proportion and under conditions effective to form a slurry comprising soluble magnesium sulfate and a silica leach residue (SLR), and adding to the slurry a solution of an alkali metal silicate in a molar equivalent proportion of $MgO:SiO_2$ of 1:2.0–4.0 under conditions effective to precipitate the magnesium ions and form a product comprising a low-structure magnesium silicate and SLR having a proportion of $SiO_2$:MgO:SLR of 50–75%:5–12%:10–50% by weight of the product.

A low-structure magnesium silicate SLR filler comprises 50 to 75 wt % $SiO_2$, 5 to 12 wt % MgO, 10 to 50 wt % SLR, 0 to 6 wt % $Fe_2O_3$, and 0 to 7 wt % $Al_2O_3$, wherein the proportion $MgO:SiO_2$ is 1:2.0–4.0.

A paper product comprises at least an amount of the filler of the invention.

A method of reducing the strike through of a paper product comprises adding 0.001 to 8 wt % of the filler described above to a paper to form a low-brightness, low-strike through paper product.

8 Claims, 3 Drawing Sheets

Fig. 2

Fig. 1

LOW BRIGHTNESS MAGNESIUM SILICATE SLR FILLER LOW BRIGHTNESS PAPER CONTAINING THE FILLER AND METHODS TO PRODUCE THE FILLER AND USE IT IN LOW BRIGHTNESS PAPERS

CROSS-REFERENCE TO RELATED APPLICATIONS

This application is a continuation of copending U.S. application Ser. No. 07/262,930, filed Oct. 26, 1988, abandoned; which is a continuation-in-part of Ser. No. 243,398, filed Sep. 12, 1988, abandoned; which is a continuation-in-part of Ser. No. 034,991, filed Apr. 6, 1987, now U.S. Pat. No. 4,780,297, issued Oct. 25, 1988.

BACKGROUND OF THE INVENTION

1. Field of the Invention

This invention relates to a novel low-brightness product comprising a low-structure magnesium silicate and a silica leach residue or SLR, optionally containing soluble iron, which is especially useful as a filler for newsprint. This invention also relates to a method for its preparation from a mineral source containing soluble magnesium, e.g., the mineral serpentine or other minerals, and an alkali metal silicate, and a method for using the novel filler in low brightness paper.

2. Description of the Background

Low-cost, low-brightness fillers for use in ground wood specialties and newsprint are known. The paper industry is showing an increasing need for a lower cost, lower brightness filler of this type which will provide comparable performance with higher cost materials prepared from silica, such as the commercial product Zeolex ®, a trademark of the J. M. Huber Corporation. The present invention meets this need by providing a low-brightness product comprising a low-structure magnesium silicate SLR filler prepared from a low cost mineral raw material containing soluble magnesium, and optionally soluble iron, and silica, such as the mineral serpentine. The precipitation of magnesium silicate from sodium silicate and a magnesium salt is known and has been described in the literature (e.g., U.S. Pat. No. 3,401,015 to Ninger). However, in most cases the processes described in the prior art are tailored for the specific purpose of obtaining pure magnesium silicate as in the case where the product is intended for use as a pharmaceutically-acceptable carrier for a drug. In these products the presence of other components is undesirable. Other processes produce magnesium silicate lacking a low-structure as defined in Wason, J. Soc. Cosmet. Chem. 29:497–521 (August 1978), the entire content of which is incorporated herein by reference, and/or contain a silicate but not SLR, and optionally iron.

Specific compositions of magnesium silicate are also known (Vournazos, Hydraulischer und weisser Magnesiazement, Zeitschrift fur anorganische und allegemeine Chemie 200:237–244(1931); Strese et al, Synthese von Magnesium-silikatgelen mit zwei dimensional regelmassiger Struktur, Zeitschrift fur anorganische und allgemeine Chemie 247:65–95(1941)). Other authors have reported that the compositions of the magnesium silicate product vary depending on the precipitation conditions. Thus, the composition of the final product has been described as a sodium magnesium silicate (Gmelins Handbuch der anorganischen Chemie, System 27, Mg, Teil B, Lieferung 3, Weinheim, Verlag Chemie GmbH, p. 443 (1938)) and magnesium silicate (Vournazos, Hydraulischer und weisser Magnesiazement, Zeitschrift fur anorganische und allegemeine Chemie, 200:237–244(1931); Strese et al, Synthese von Magnesium-silikatgelen mit zwei dimensional regelmassiger Struktur, Zeitschrift fur anorganische und allgemeine Chemie 247:65–95 (1941); Hinz et al, Uber die Fallungsprodukte von Magnesiumsalz- und Wasserglas-losungen, Silikat Technik 8:148–156(1957)).

In later work it was shown that the molar ratio of the produced magnesium silicate is the same as the molar ratio of the sodium silicate used in the precipitation (Roseman et al, Journal of the American Pharmaceutical Association 99:271–277(1940)). The sodium oxide content of the final product is said to be low if the magnesium salt is in excess in the precipitation and increases with a sodium silicate excess (Hinz et al, supra).

Fine-particle, synthetic silicas are amorphous, submicron size, white powders. These products have been referred to interchangeably as silicas, hydrated silicas, silicon dioxide, silicic acid, fillers, silicates, silica pigments, xerogels, aerogels and amorphous silicas, among other names.

A distinguishing factor among silicas is the method utilized for preparing the silicas or silicates. When silicas are precipitated from a solution or slurry their structure and associated properties can be controlled. These controlled structure silicas have been named Very High Structure (VHS), High Structure (HS), Medium Structure (MS), Low Structure (LS) and Very Low Structure (VLS) Silicas. Each group has diverse characteristics which are related to their structure such as particle size, water porosity, BET surface size and silanol group density, among others.

Low-Structure Silicas (LS) or silicates have a characteristic Water Pore Volume (PV), Structure Index (SI: amount of water associated with 100 parts of the dry recoverable product) and % Wet Cake Moisture (% WCM: structural water or the amount associated with a washed silica precipitate) (Wason, J.Soc.Cosmet.- Chem., supra). The characteristic values of these parameters distinguish LS from other types of silicates.

Asbestos tailings from serpentine mineral wastes are known as a source of magnesium salts with mineral acids (U.S. Pat. Nos. 2,402,370 to Chalmers, 3,320,029 to Adams and 4,058,587, 4,277,449 to Lalancette and Canadian Patent No. 1,034,385 to Marek et al). Moreover, the methods utilized by the prior art separate the soluble salts from any insoluble residue (e.g., U.S. Pat. No. 4,277,449).

Thus, many of the prior art products are not suitable for use as a newsprint filler, and those which would be do not have the composition, low-structure, low-brightness characteristics of the filler of the invention.

Accordingly, there still is a need for a magnesium silicate filler formed by precipitation which has superior characteristics for use as a low brightness filler for newsprint.

SUMMARY OF THE INVENTION

The present invention relates to a novel method for producing a low-structure magnesium silicate SLR filler useful for lowering the strike through of low brightness paper products, comprising adding a raw mineral source of soluble magnesium ions and sulfuric acid in a proportion and under conditions effective to form soluble magnesium sulfate and a silica leach residue (SLR), and adding thereto a solution of an alkali metal silicate in a molar equivalent proportion of $MgO:SiO_2$ of about 1:2.0–4.0 and under conditions effective to precipitate the magnesium ions and form a low-structure magnesium silicate SLR product comprising a proportion of $SiO_2:MgO:SLR$ of about 50–75%:5–12%:10–50% by weight of the product.

This invention also provides a novel low-structure magnesium silicate SLR filler useful for lowering the strike through of a low brightness paper product, comprising about 50 to 75 wt % $SiO_2$;
about 5 to 12 wt % $MgO$;
about 1 to 50 wt % SLR;
about 0 to 6 wt % $Fe_2O_3$;
about to 0 to 7 wt % $Al_2O_3$; wherein the molar equivalent proportion of $MgO:SiO_2$ is about 1:2.0–4.0.

In addition, this invention also provides a paper product comprising paper; and
an amount of the low-structure filler of this invention.

Moreover, the invention also provides a method of reducing the strike through of a paper product comprising adding about 0.001 to 8 wt % of the low-structure magnesium silicate SLR filler of this invention to a paper to form a low-brightness, low-strike through paper product.

A more complete appreciation of the invention and many of the attendant advantages thereof will be readily perceived as the same becomes better understood by reference to the following detailed description when considered in connection with the accompanying figures.

BRIEF DESCRIPTION OF THE DRAWINGS

Reference is now made to the drawings accompanying the application.

Other objects, advantages and features of the present invention will become apparent to those skilled in the art from the following discussion.

DESCRIPTION OF THE PREFERRED EMBODIMENTS

The present invention arose from a perceived need for a lower cost lower brightness filler for use in lowering the strike through of paper such as newsprint and other applications where high brightness is not only not a requirement, but is undesirable.

According to the present invention a magnesium silicate filler can be produced from a low cost raw material comprising a mineral source of soluble magnesium, and optionally iron ions, and silica. An example of such mineral is the mineral serpentine which has the necessary characteristics to serve as a low cost source for the low-brightness paper filler of this invention. The product of the invention also retains other characteristics which make it useful as a filler for paper, particularly for newsprint.

According to this invention, a low-brightness product comprising a low-structure magnesium silicate and SLR can be obtained by precipitation from a raw mineral source of magnesium, optionally containing iron, such as serpentine, by dissolving the mineral in sulfuric acid and precipitating a low-structure amorphous magnesium silicate with an alkali metal silicate in the presence of the SLR. In this invention, the brightness of the filler can be varied by varying the iron content in the raw material and/or the proportion of the components of the final product.

The magnesium silicate SLR filler of this invention is prepared from a mineral or group of minerals comprising a source of soluble magnesium ions, and optionally iron ions, and silica. Preferred examples of these minerals are serpentine minerals. The serpentine group of minerals all have the following approximate composition.

$Mg_3[Si_2O_5](OH)_4$

This empirical formula is also sometimes written as follows $H_4Mg_3Si_2O_9$ or $3MgO.2SiO_2.2H_2O$ Comparatively little substitution of other ions is found to occur in the natural rock specimens. Many experimental results point to the existence of serpentine with a curved sheet structure. The mineral is soluble in dilute acid solutions and is often found as the primary component of rocks called serpentinite, which is found in the gangues of mines. For example, serpentinite has been found in the gangue of a nickel mine in Finland (the Hitura nickel mine situated in Nivala, East Bothnia, Finland).

The structure of serpentine comprises a tetrahedral $Si_2O_5$ network joined to a brucite $Mg_3(OH)_4$ layer. Serpentine is less slippery than talc and contains less layers and is more hydrophilic than talc. In addition, the solubility in acid of the magnesium contained in serpentine is higher than that contained in talc.

Any mineral silicate source of soluble magnesium ions, and optionally soluble iron ions, may be used in the method of the invention. A preferred starting material though is serpentine, and more preferably yet the serpentine found in the Hitura serpentinite material described above. This material is a uniquely cationic mineral which becomes more cationic when milled.

The serpentine material may contain varying amounts of iron. The serpentine found in Finland, for example, contains about 6 to 7 wt % iron partly in the lattice, partly as magnetite. The iron content of a mineral is important since the brightness of the mineral depends on it. Minerals containing higher amounts of iron are less bright than those with lower iron contents. The higher the content of iron the lower the brightness of the mineral in general. The serpentine mineral is hydrophilic, soluble in dilute acids and has a remarkably large specific surface area for a mineral, substantial free bonding capability and is soft, plastic and workable. It, in addition, contains substantially no asbestos or quartz.

The magnesium silicate SLR filler of the invention is produced from a raw mineral source containing soluble magnesium, e.g., serpentine, by initially adding the serpentinite or corresponding serpentine-containing material and sulfuric acid together to form magnesium sulfate dissolved in the sulfuric acid solution. The serpentinite has excellent solubility in sulfuric acid at temperatures below about 100° C. using dilute sulfuric acid concentrations of up to about 30 wt % aqueous sulfuric acid.

The dissolution of magnesium ions from the mineral in sulfuric acid is an exothermic reaction which has a remarkably slower reaction velocity at a temperature of 25° C. than at 90° C. Only about 57% of the magnesium in the mineral dissolves at 25° C. in one hour, while at 90° C. the percentage is about 90% under otherwise similar conditions. At 25° C. about 67% of the magnesium in the mineral dissolves in four hours. At a temperature of 200° C. the percentage of dissolved magnesium is about the same as at 90° C. Therefore, a dissolving temperature of below about 100° C. is sufficient to reach a desirable reaction velocity. However, other temperatures may be utilized as well.

The lower limit of the sulfuric acid concentration is given by the magnesium concentration desired in the produced solution. The upper limit of the sulfuric preferably about 50° to 100° C. It may be necessary to heat for a period of time, possibly from about 0.5 hour up to eight hours to achieve adequate and complete or desired level of solubilization of the magnesium. More preferably, the reaction temperature is about 25 to 90° C. and the time about 0.5 to 5 hours.

In the second step of the method the magnesium ions are precipitated from the magnesium sulfate solution in the presence of the SLR as magnesium silicate by reaction with an alkali metal silicate. It is the precipitation of the magnesium silicate in the presence of the SLR, inter alia, which gives the novel product its low-brightness characteristics. Accordingly, the precipitation of the magnesium silicate is to be conducted without a prior separation of the SLR from the magnesium ions-containing solution. The alkali metal silicate is added in an amount sufficient to precipitate the magnesium ions as magnesium silicate.

The amount of alkali metal silicate to be added to form the magnesium silicate is preferably at least a molar equivalent amount required to react with the magnesium ions present in the solution. At the stated temperature and preferably at about 50°-100° C., the alkali metal silicate, preferably sodium silicate, is added as an aqueous solution of any desired concentration. More preferably the alkali metal silicate is added as an aqueous solution having a concentration of about 100-400 g/l, and still more preferably about 200-300 g/l.

In a preferred embodiment of the method an excess of silicate is continued to be added to the solution until a pH of about 8-10 is achieved, and more preferably about 9.5. In all cases, the alkali metal solution is added to the slurry in the presence of the SLR which will thus be incorporated as part of the low-structure magnesium silicate SLR filler product.

In a more preferred procedure, the alkali metal silicate and the magnesium sulfate SLR slurry are added simultaneously to a reactor. The rate of addition of the alkali metal silicate is preferably about 1-3 times the rate of the addition of the magnesium sulfate SLR slurry, and more preferably about 1-2 times. During the addition, the precipitation pH is preferably maintained at about 9.0 to 10.0, and more preferably 9.3 to 9.8, and the temperature is maintained at about 60° to 95° C., and more preferably 70° to 80° C.

In this preferred procedure, the addition of the alkali metal silicate is stopped at the stated pH, and the addition of the magnesium sulfate SLR slurry continued until a final pH of about 8.5 is reached. Pigment stabilization may then be carried out with the addition of alum under conditions known in the art. The addition of alum may be conducted during the precipitation of the filler or after the precipitated magnesium silicate SLR product is separated from its mother liquor.

As a result of this method, a novel magnesium silicate SLR product is obtained which is an excellent pigment, particularly for use as a filler in paper, and more particularly in newsprint. The overall characteristics of the novel product of the invention as a paper filler are comparable to those of the commercial product Zeolex ® without the unwanted increase in brightness brought about by the Zeolex ® product. Accordingly, the magnesium silicate SLR product of the invention is eminently suitable for use as a filler in newsprint and superior to prior products in its capability not to increase the brightness of paper, particularly newsprint, when added thereto in the specified amounts.

For this particular use the brightness $R_{457}$ of the paper product comprising the filler of the invention should be in the range of about 50–80, and its oil absorption should be about 50–90 ml/100 g as measured by the ASTM rub out method (ASTM Test D281), both these methods being known in the art.

Figure 1:
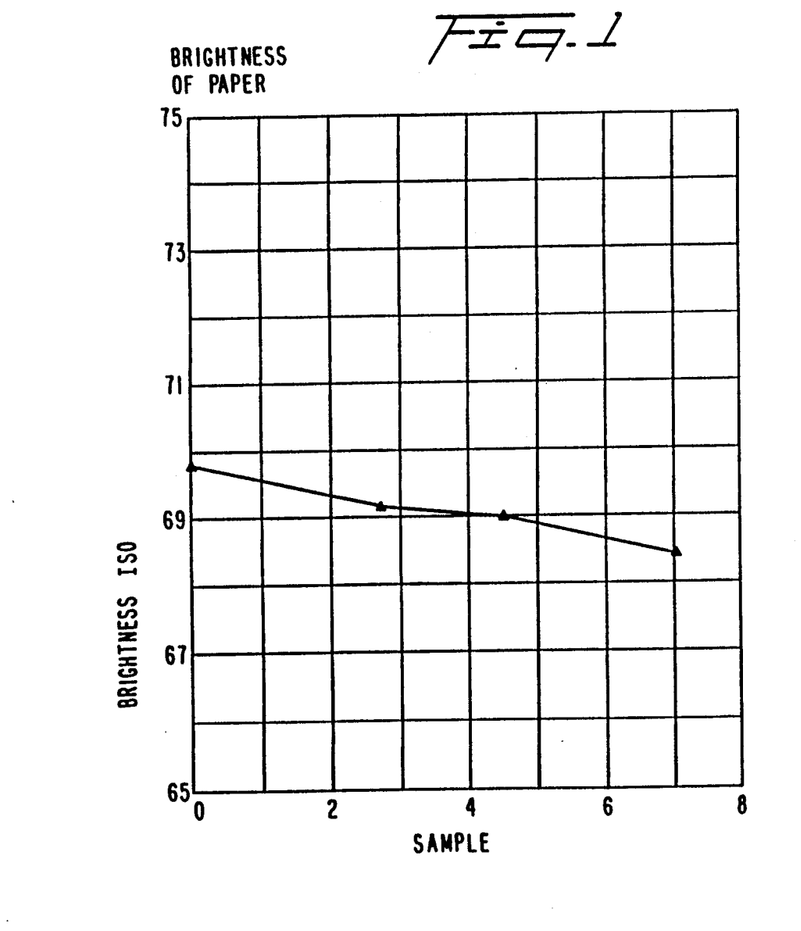
FIG. 1 shows the brightness of paper filled with the magnesium silicate of this invention.
Figure 2:
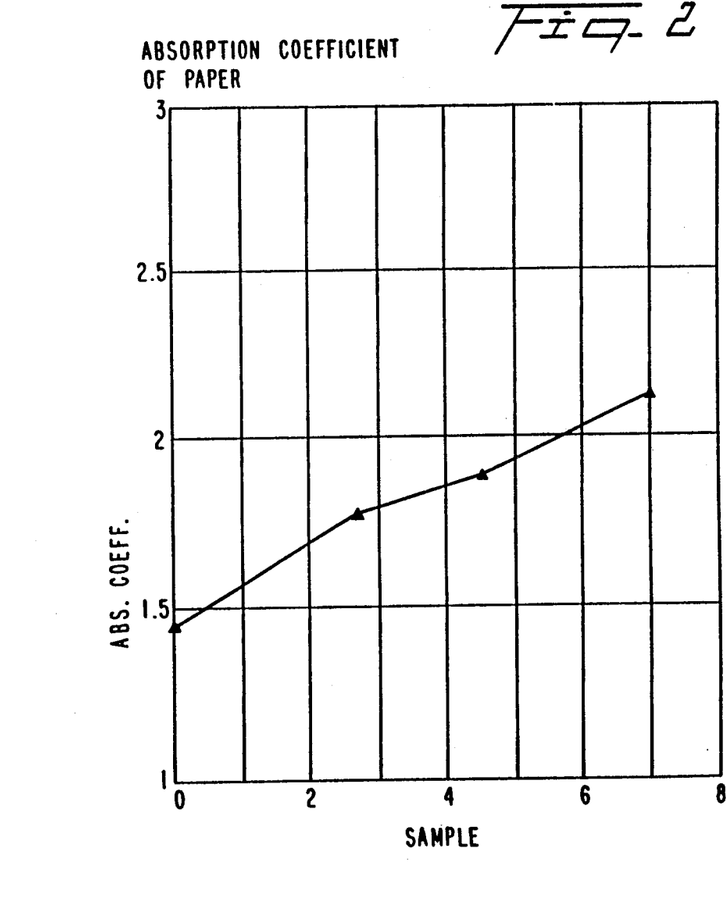
FIG. 2 shows the absorption coefficient of paper when filled with the magnesium silicate of the invention.

The absorption coefficient of the paper is shown in FIG. 2 for the incorporation of varying amounts of the magnesium silicate SLR filler into a paper. The absorption coefficient of the paper rises well above 2 as the amount of the magnesium silicate in the paper increases.

Figure 3:
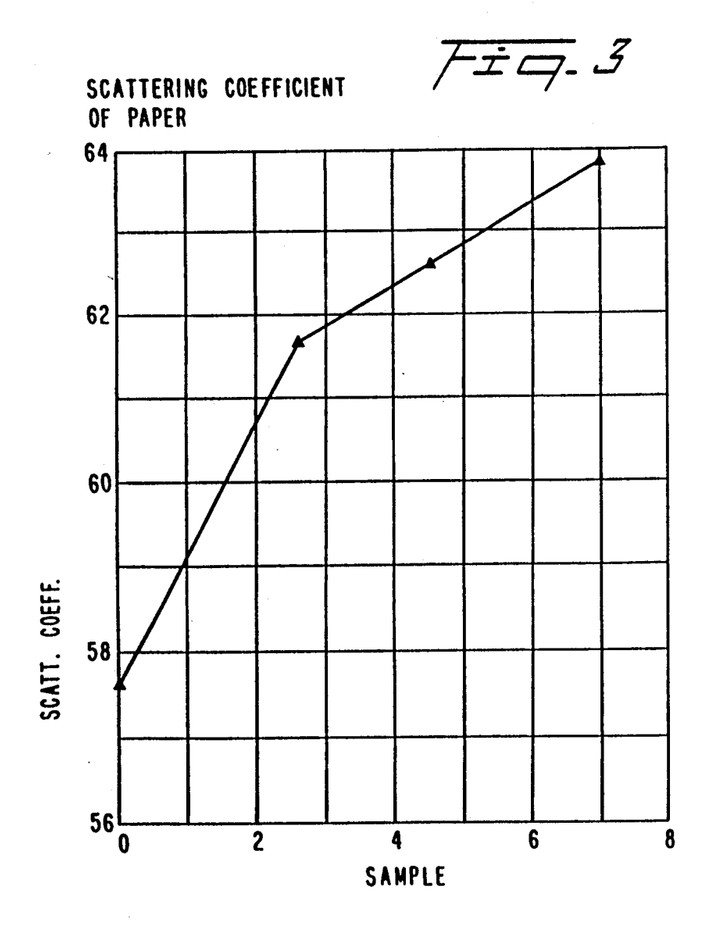
FIG. 3 shows the scattering coefficient of paper when filled with the magnesium silicate of this invention.

The scattering coefficient of a paper having incorporated therein increasing amounts of the magnesium silicate SLR filler in accordance with this invention is shown in FIG. 3. The scattering coefficient of the paper increases from less than 58 for the unfilled paper up to about 63.8 for the same paper containing 7% of the magnesium silicate SLR filler of this invention.

Figure 4:
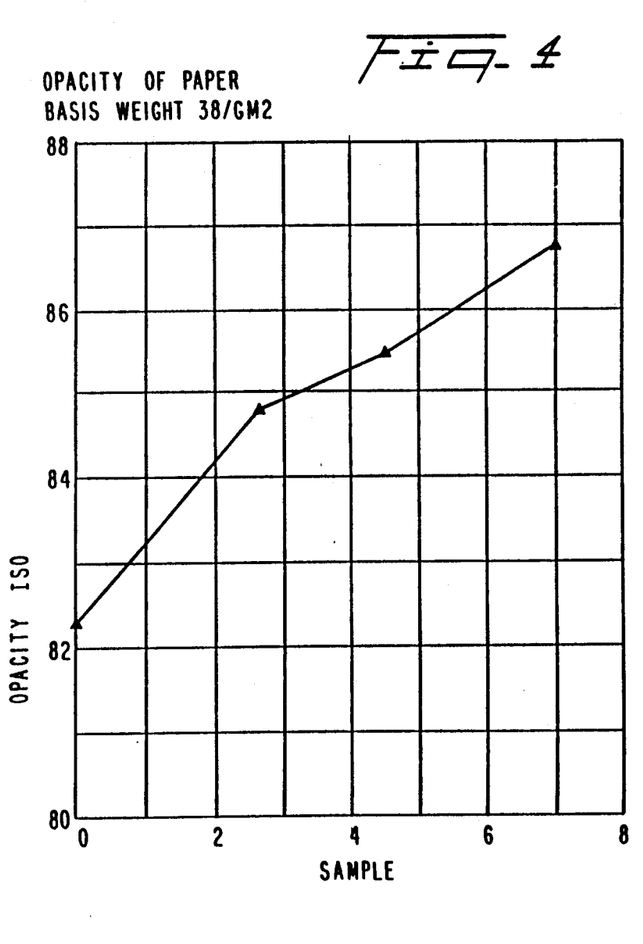
FIG. 4 shows the opacity of paper when filled with the magnesium silicate of this invention.

FIG. 4 illustrates the opacity of an unfilled paper and that of the same paper filled with the magnesium silicate SLR pigment of this invention. The opacity of the unfilled paper product increases from about 82.3 up to about 86.8 for the paper containing 7 wt. % of the magnesium silicate SLR pigment of this invention.

Figure 5:
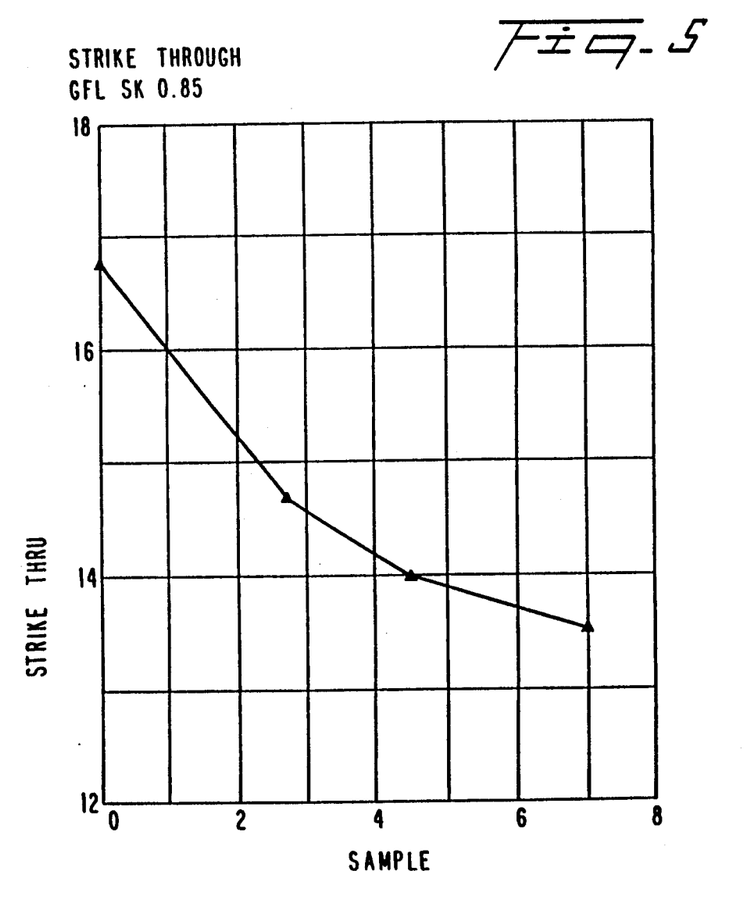
FIG. 5 shows the strike-through characteristics of paper when filled with the magnesium silicate of this invention.

FIG. 5 shows the strike through of unfilled newsprint and that of the same newsprint containing varying amounts of the magnesium silicate SLR filler of this invention. As shown in FIG. 5, the initial strike through for the unfilled newsprint is about 16.8. Upon addition of the novel magnesium silicate SLR filler the strike through of the same paper is reduced to 14 for a content of 4.5% of the filler, and down to about 13.6 for a content of 7% of the magnesium silicate filler.

Thus, the magnesium silicate SLR filler of this invention provides the paper advantageous characteristics while maintaining its brightness to a level desirable for newsprint. These are clearly superior results evidenced by the paper product of this invention and the filler utilized therein.

The product of this invention is a low-structure magnesium silicate SLR filler comprising
  about 50 to 75 wt % $SiO_2$;
  about 5 to 12 wt % MgO;
  about 10 to 50 wt % SLR;

about 0 to 6 wt % $Fe_2O_3$; and about 0 to 7 wt % $Al_2O_3$; wherein the proportion $MgO:SiO_2$ is about 1:2.0–4.0.

In a preferred embodiment of the invention the low-structure magnesium silicate SLR filler of the invention comprises about 55–65 wt % $SiO_2$;
about 7–10 wt % MgO;
about 10–40 wt % SLR;
about 1–5 wt % $Fe_2O_3$; and
about 1–6 wt % $Al_2O_3$; wherein the proportion of $MgO:SiO_2$ is about 1:2.5–3.5.

In still a more preferred embodiment of the invention the low-structure magnesium silicate SLR filler of the invention contains up to about 33 wt % SLR. This range is particularly useful when the mineral source of magnesium ions and silica is rich in iron.

In still another preferred embodiment of the invention, the low-structure silicate has a particle size ranging from about 5–300 nanometers, and more preferably 50–250 nanometers. In still a more preferred embodiment of this invention the average particle size of the low-structure silicate is at least about 30 nanometers, and more preferably at least about 50 nanometers.

In another preferred embodiment, the low-structure silica SLR filler has a Water Pore Volume (PV) greater than about 1.5 or a Structure Index (SI) greater than about 150.

The magnesium silicate SLR filler can be prepared by the method of the invention described above.

This invention also provides a novel paper product comprising paper and at least a strike through lowering amount of the magnesium silicate SLR filler of the invention. In a preferred embodiment of the paper product of the invention the magnesium silicate SLR filler is present in an amount of about 0.001 to 8 wt % of the paper product, and more preferably about 0.01 to 7 wt % of the product. In a still more preferred embodiment, the magnesium silicate SLR filler of the invention is present in an amount of about 0.1 to 5 wt % of the paper product. The paper product containing the specified amounts of the filler of the invention exhibits a brightness of about 50 to 80 $R_{457}$, and more preferably about 60 to 75 $R_{457}$.

In another preferred embodiment of the invention, the paper product to which the magnesium silicate SLR filler is added is newsprint. The paper product obtained in accordance with the invention exhibits low brightness and strike through and high absorption and scattering coefficients and high opacity.

This invention also provides a method of reducing the strike through and increasing the opacity and scattering and absorption coefficients of a paper which comprises adding about 0.001 to 8 wt % of the silica SLR filler of this invention to the paper, preferably 0.01 to 7 wt %, and still more preferably 0.1 to 5 wt %.

The following conclusions are drawn from the characteristics of the products and methods of the invention and are substantiated and supported by the below described examples.

(1) The retention of the magnesium silicate SLR filler of the invention is the same or better than that of Zeolex ®.

(2) The formation of the paper product is constant or slightly better when the novel magnesium silicate SLR filler is added compared to the control paper.

(3) If the bulk of the calendered samples is controlled the magnesium silicate SLR filler-containing paper is smoother than the control sample.

(4) The porosity of the magnesium silicate SLR filler-containing paper increases with respect to that of unfilled paper.

(5) The brightness and Y-value of the magnesium silicate SLR filler-containing paper decreases and the absorption coefficient increases with respect to the unfilled paper due to too bright furnish.

(6) The scattering coefficient of the magnesium silicate SLR filler-containing paper increases with respect to unfilled paper in a manner similar to that effected by the addition of Zeolex ®.

(7) The opacity of the paper increases by one unit for each % unit of magnesium silicate SLR filler added thereto.

(8) The ink requirements of the filled and unfilled papers are unchanged.

(9) Strike through for the novel filler-containing paper decreases with respect to the unfilled paper.

These results can be summarized by stating that when the novel magnesium silicate SLR filler of the invention is added to wood-containing paper in the specified amounts its performance is completely and essentially at a par with that of Zeolex ® with the addition that it affords the paper an extremely desirable lower brightness.

The following examples illustrate the process and products of the present invention, but the invention is not to be considered as limited thereto. In the examples and throughout the specification, parts are by weight unless otherwise indicated. In the present tests the brightness value $R_{457}$ is the reflectivity value for brightness measured using an Elephro reflectometer as is known in the art. In the drawings ISO stands for International Standards Organization.

EXAMPLES

In the following examples, the starting material is a serpentinite mineral obtained from the Hitura mine in Finland. The chemical analysis of the serpentinite is described in Table 1 hereinbelow.

TABLE 1

| Chemical analysis of Hitura sepentinite | |
|---|---|
| | (wt %) |
| $SiO_2$ | 37.2 |
| MgO | 35.0 |
| Fe | 6.7 |
| Ni | 0.22 |
| Na | 0.22 |
| Al | 0.36 |
| S | 0.56 |
| Cu | 0.05 |

The physical properties of a typical serpentinite are described in Table 2 hereinbelow.

TABLE 2

| Physical properties | |
|---|---|
| pH (20%) | 8.90 |
| Surface area ($M^2$/g) | 40 |
| Oil-absorption (ml/100 g) | 38.3 |
| Mesh 325 residue (5) | 0.25 |
| Ignition loss (%) | 13.6 |
| APS ($\mu$m) | 5.7 |
| Brightness ($R_{457}$) | 40.7 |

The particle size distribution of a typical serpentinite is shown in Table 3 hereinbelow.

TABLE 3

| Particle Size Distribution | |
|---|---|
| (μm) | (%) |
| −40 | 100 |
| −30 | 96 |
| −20 | 88 |
| −15 | 84 |
| −10 | 78 |
| −5 | 61 |
| −3 | 43 |
| −2 | 30 |
| −1 | 16 |

EXAMPLE 1

Effect of Various Sulfuric Acid Concentrations and Equivalent Ratio Acid: Mineral on Dissolution of Iron The effect of the concentration of sulfuric acid and the equivalent ratio of acid:mineral on the dissolution of iron (calculated at 34 $Mg^{++}$ g/l in the solution) is determined for various sulfuric acid concentrations and equivalent ratios as described in Table 4 hereinbelow.

TABLE 4

Effect of the Sulfuric Acid Concentration and Equivalent Ratio Acid:Mineral on the dissolution of Iron.

| $H_2SO_4$ (%) | Equivalent Acid Ratio | | |
|---|---|---|---|
| | 0.6 | 0.685 | 0.825 |
| | Fe (g/l) | | |
| 15 | 13.4 | 8.95 | 7.6 |
| 20 | 9.3 | 8.3 | 7.9 |
| 30 | 8.3 | 6.1* | 5.7 |

*T = 90° C., all other T = 70° C.

EXAMPLE 2

Effect of Sulfuric Acid Concentration and Equivalent Ratio Acid: Mineral on the Dissolution of Magnesium The effect of the concentration of sulfuric acid and the equivalent ratio of acid:mineral on the dissolution of magnesium (%) is determined for various sulfuric acid concentrations and equivalent ratios. The results are described in Table 5 hereinbelow.

TABLE 5

Effect of Sulfuric Acid Concentration and Equivalent Ratio Acid: Mineral on the Dissolution of Magnesium

| $H_2SO_4$ (%) | Equivalent Acid Ratio | | | | |
|---|---|---|---|---|---|
| | 0.5 | 0.6 | 0.685 | 0.8 | 0.825 |
| | Mg (%) | | | | |
| 10 | — | — | — | 86.5 | — |
| 15 | 59.9 | 72.6 | 75.3 | — | 87.7 |
| 20 | 57.2 | 70.4 | 76.3 | — | 85.3 |
| 30 | — | 70.1 | 89.7* | — | 87.5 |

*T = 90° C., all other T = 70° C.

EXAMPLE 3

Effect of Sulfuric Acid Concentration and Equivalent Ratio Acid: Mineral on SLR Content The effect of sulfuric acid concentration and equivalent ratio of acid:mineral on the SLR content in the solution is determined for a dissolution calculated at 34 $Mg^{++}$ g/l. The results are reported in Table 6 below.

TABLE 6

Effect of Sulfuric Acid Concentration and Equivalent Acid Ratio on the SLR Content.

| $H_2SO_4$ (%) | Equivalent Acid Ratio | | |
|---|---|---|---|
| | 0.6 | 0.685 | 0.825 |
| | SLR (g/l) | | |
| 15 | 151 | 132 | 97 |
| 20 | 149 | 132 | 116 |
| 30 | — | 122* | 111 |

*T = 90° C., all other T = 70° C.

EXAMPLE 4

Preparation of Magnesium Silicate SLR Filler

A magnesium silicate SLR product is prepared. 5.7 liters of water which contain 4% sodium sulfate are initially placed in a reactor. A sodium silicate solution having a concentration of 270 g/l and an MR of 3.3 is then added to the reactor. The sodium silicate is added at a flow rate of 0.385 liters per minute.

A dilute magnesium sulfate SLR slurry having a magnesium ion concentration of 34 g/l is simultaneously added. The solution parameters are: sulfuric acid 30%, acid:mineral equivalent ratio 0.85 and a temperature of 80°–100° C. The iron, $SO_4=$ and SLR contents of this reaction can be affected by changing the dissolution parameters of the serpentinite. The flow rate of this solution is 0.220 liters per minute. Alum may be included in this solution at a concentration of 358 g/l for pigment stabilization (Batch B).

TABLE 9

Comparison of Theoretical, Unstabilized and Chemical Analysis Compositions

| | Theoretical composition (Unstabilized) | Chemical analysis (Stabilized) |
|---|---|---|
| FeO | 2.4 | 2.5 |
| MgO | 11.3 | 8.0 |
| $SiO_2$ | 63.7 | 73.4 |
| Na | 2.4 | 0.95 |
| $Na_2SO_4$ | 5.0 | — |
| Al | 0.09 | 1.9 |
| S | 0.15 | 0.18 |
| LOI | 15.0 | 13.07 |

The analyses for magnesium and SLR content and free acid are determined as set forth below. Iron is analyzed by an outside laboratory.

MAGNESIUM TEST

A known method for the analysis of magnesium is used. In this method magnesium is determined titrimetrically by means of Titriplex ® III (Sodium-EDTA+-NaOH, Merck 9992) and indicator buffer tablets (Merck 8430) normally used for determination of water hardness. Calcium is not present herein in large enough amounts to interfere. The SLR has to be filtered off to separate it from the solution to be tested and the iron ions masked with triethanolamine before the titration.

The dissolution sample is filtered and diluted 1:2,000 with deionized water. 10 ml triethanolamine (dilution 1:1) and one indicator tablet are added in 100 ml of the diluted sample. After the tablet has dissolved, 1 ml 25% ammonia is added to adjust the pH. The solution is then titrated with a 0.01 M Titriplex ® III solution until the color of the solution changes from red to green. The results agree well with AAS determinations of magnesium.

SLR Test

The silica leach residue (SLR) content is determined by filtering 250 ml slurry through a quantitative filter paper using suction. The cake is then washed with hot deionized water and dried at 150° C. for 16 hours. The SLR content (g/l) is calculated and reported in Table 6.

The chemical analysis is made on an SLR sample from a test with the following dissolution parameters:

Sulfuric Acid Concentration: 30 %
Equivalent Ration Acid:Mineral: 0.85
Temperature: 90°–100° C.

TABLE 10

| Chemical analysis of SLR sample* | |
|---|---|
| Element | Content % |
| Fe | 6.7 |
| Mg | 9.9 |
| $SiO_2$ | 60.9 |
| Na | 0.18 |
| Al | 0.50 |
| S | 0.83 |

*30% $H_2SiO_4$; 0.850 equiv. acid ratio; T = 90–100° C.

FREE ACID TEST

Free acid in the SLR $MgSO_4$ mixture is tested by titrating the filtrate with 0.1 M NaOH. The calculated free acid content changes from 0.04 to 0.13 g/l depending on the concentration of the sulfuric acid, equivalent acid ratio and dissolving temperature used. The pH of the filtrates are about 2–3, which indicates the same free acid contents as measured by the titration.

EXAMPLE 5

Preparation of Newsprint with the Magnesium Silicate SLR Filler of the Invention A newsprint is prepared on a pilot paper machine at the Finnish Pulp and Paper Research Institute (FPPRI) in Finland under the conditions indicated in Table 11 below.

TABLE 11

| Conditions of Preparation of Newsprint | | |
|---|---|---|
| | | Amount |
| Furnish | Groundwood | 80% |
| | Bleached pine pulp | 20% |
| Freeness (CSF) | Groundwood | 78 ml |
| | Pulp | 500 ml |
| | Furnish | 106 ml |
| pH | | 4.8–5.2 |
| Retention aid | | none |

The results of the tests are shown in the attached Tables 12 and 13 hereinbelow and FIGS. 1–5.

What is claimed is:

1. A low-structure magnesium silicate silica leach residue filler, comprising
   about 50 to 75 wt % $SiO_2$;
   about 5 to 12 wt % MgO;
   about 10 to 50 wt % silica leach residue;
   about 1 to 6 wt % $Fe_2O_3$; and
   about 0 to 7 wt % $Al_2O_3$; wherein the proportion $MgO:SiO_2$ is about 1:2.0–4.0.

2. The filler of claim 1, wherein the silica leach residue is present in an amount of up to about 33 wt %.

3. The filler of claim 1, wherein the low-structure silicate has a particle size of about 5 to 300 nanometers.

4. A low-structure magnesium silicate silica leach residue filler, comprising
   about 50 to 75 wt % $SiO_2$;
   about 5 to 12 wt % MgO;
   about 10 to 50 wt % silica leach residue;
   about 1 to 6 wt % $Fe_2O_3$; and
   about 0 to 7 wt % $Al_2O_3$; wherein the proportion $MgO:SiO_2$ is about 1:2.0–4.0, produced by
   adding a raw mineral source of soluble magnesium ions and sulfuric acid in a proportion and under conditions effective to form a slurry comprising soluble magnesium sulfate and a silica leach residue; and
   adding to the slurry a solution of an alkali metal silicate in a molar equivalent proportion $MgO:SiO_2$ of about 1:2.0–4.0 and under conditions effective to precipitate the magnesium ions and form a product comprising a low-structure magnesium silicate and SLR having a proportion of $SiO_2:MgO:SLR$ of about 50–75%:5–12%:10–50% by weight of the product.

5. A low-structure magnesium silicate silica leach residue filler, comprising
   about 50 to 75 wt % $SiO_2$;
   about 5 to 12 wt % MgO;
   about 10 to 50 wt % silica leach residue;
   about 1 to 6 wt % $Fe_2O_3$; and
   about 0 to 7 wt % $Al_2O_3$; wherein the proportion $MgO:SiO_2$ is about 1:2.0–4.0, produced by
   reacting a raw serpentine-containing mineral and sulfuric acid in a proportion and under conditions effective to form a slurry comprising soluble magnesium sulfate and a silica leach residue (SLR); and
   adding to the slurry a solution of an alkali metal silicate in a molar equivalent proportion $MgO:SiO_2$ of about 1:2.0–4.0 and under conditions effective to precipitate magnesium silicate and form a product comprising a low-structure magnesium silicate and SLR having a proportion of $SiO_2:MgO:SLR$ of about 50–75%:5–12%:10–50% by weight of the product.

6. A low-structure magnesium silicate silica leach residue filler, comprising
   about 55 to 65 wt % $SiO_2$;
   about 7 to 10 wt % MgO;
   about 10 to 40 wt % silica leach residue;
   about 1 to 5 wt % $Fe_2O_3$; and
   about 1 to 6 wt % $Al_2O_3$; wherein the proportion $MgO:SiO_2$ is about 1:2.5–3.5, produced by
   reacting a raw serpentine-containing mineral and sulfuric acid in a proportion and under conditions effective to form a slurry comprising soluble magnesium sulfate and a silica leach residue (SLR); and
   adding to the slurry a solution of an alkali metal silicate in a molar equivalent proportion $MgO:SiO_2$ of about 1:2.0–4.0 and under conditions effective to precipitate the magnesium ions and form a product comprising a low-structure magnesium silicate and SLR having a proportion of $SiO_2:MgO:SLR$ of about 50–75%:5–12%: 10–50% by weight of the product.

7. A low-structure magnesium silicate silica leach residue filler, comprising
   about 50 to 75 wt % $SiO_2$;
   about 5 to 12 wt % MgO;
   about 10 to 50 wt % silica leach residue;

about 1 to 6 wt % $Fe_2O_3$; and about 0 to 7 wt % $Al_2O_3$; wherein the proportion $MgO:SiO_2$ is about 1:2.0–4.0, produced by reacting a raw serpentine-containing mineral and a 5 to 30 weight percent solution of sulfuric acid at a temperature of 25° to 200° C. and in a proportion to dissolve essentially all of the solubilizable magnesium contained in the serpentine to form a slurry comprising dissolved magnesium sulfate and an insoluble silica leach residue (SLR); and adding to the slurry a solution of an alkali metal silicate of a concentration of 100 to 400 g/l until a pH of about 8 to 10 is achieved and in a molar equivalent proportion $MgO:SiO_2$ of about 1:2.0–4.0 and under conditions to form a product comprising low structure Mg silicate and SLR having a proportion of $SiO_2:Mg:O$ SLR of 50–75%:5–12%:10–50% by weight.

8. A low-structure magnesium silicate silica leach residue filler, comprising about 50 to 75 wt % $SiO_2$;

about 5 to 12 wt % MgO;

about 10 to 50 wt % silica leach residue;

about 1 to 6 wt % $Fe_2O_3$; and about 0 to 7 wt % $Al_2O_3$; wherein the proportion $MgO:SiO_2$ is about 1:2.0–4.0, produced by reacting a raw serpentine-containing mineral and sulfuric acid in a proportion and under conditions effective to form a slurry comprising soluble magnesium sulfate and a silica leach residue (SLR); and adding to the slurry a solution of an alkali metal silicate in a molar equivalent proportion $MgO:SiO_2$ of about 1:2.0–4.0 and under conditions effective to precipitate magnesium silicate and form a product comprising a low-structure magnesium silicate and SLR having a proportion of $SiO_2:MgO:SLR$ of about 50–75%:5–12%:10–50% by weight of the product and wherein a stabilizing amount of alum has been added during the second reaction.

* * * * *